Nov. 29, 1949  J. F. PRIESS  2,489,540
VEHICLE AIR BRAKE SYSTEM
Filed June 23, 1948
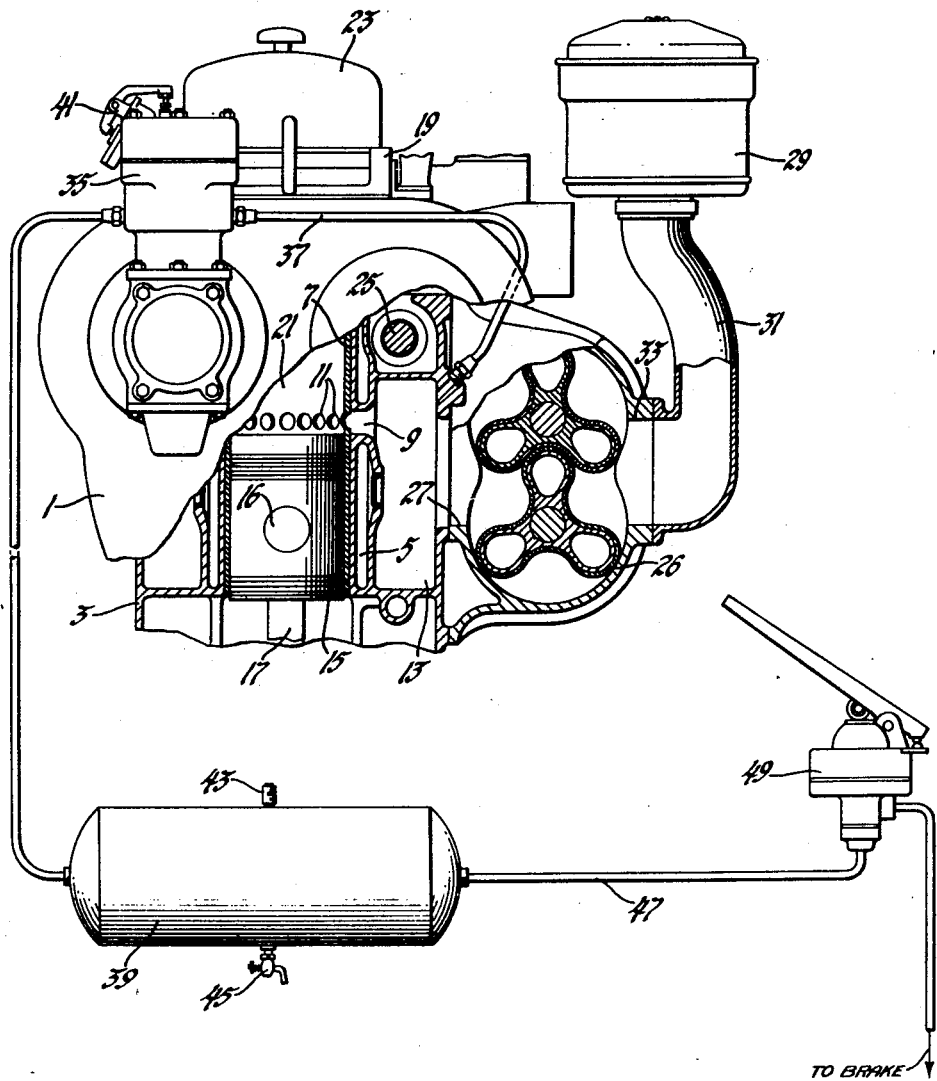
Inventor
John F. Priess
By
Spencer Willits, Helwig & Baillio
Attorneys Patented Nov. 29, 1949

2,489,540

UNITED STATES PATENT OFFICE 2,489,540

VEHICLE AIR BRAKE SYSTEM

John Frank Priess, Pontiac, Mich., assignor to General Motors Corporation, Detroit, Mich., a corporation of Delaware Application June 23, 1948, Serial No. 34,739

4 Claims. (Cl. 230—56)

The present invention generally relates to vehicle air brake systems and more particularly to improvements in the means for supplying pressure to such systems for vehicles driven by internal combustion engines.

Conventional air brake systems of this type include an air brake compressor driven by the engine and supplying air under pressure to one or more air pressure reservoirs which are connected by means of pipes including pressure application and relief valves, both manually and automatically operated, leading to the vehicle brake cylinders. Protective means are included in the system comprising an inlet air filter and drain cocks in the reservoirs and pipe connections from the compressor to drain off the excessive amounts of water and oil which condenses therein. On account of the limited space available for these protective means an inlet air filter for the compressor of inadequate capacity for dusty operating conditions is usually installed which requires frequent cleaning to prevent dust laden air entering the compressor and causing wear thereof and carry over of lubricating oil with the air delivered to the reservoirs and a reduction in the supply thereto. Frequent draining of the reservoirs and piping is necessary to remove the oil and large quantities of water condensed therein in damp and cold weather to prevent freezing even though antifreeze solutions are added to these connections in order to provide safe braking operation.

The principal object of the present invention is to overcome the difficulties present in conventional air brake systems particularly for vehicles driven by internal combustion engines supplied with induction air at super-atmospheric pressure by providing a common inlet air filter of adequate capacity to provide clean air for both the engine and compressor and for supplying the compressor with both clean and dry air at superatmospheric pressure to obtain increased output of the compressor and less condensation of oil and water in the braking system thereby reducing the time required for servicing this system over that of the conventional systems and to insure safe braking operation under adverse vehicle operating conditions.

The combination of means and the arrangement thereof by which this object and the other advantages provided thereby are obtained will become apparent by reference to the following detailed explanation and single schematic drawing illustrating these means arranged in a vehicle air brake system.

As illustrated in the drawing the improved vehicle air brake system includes an internal combustion engine 1 for driving the vehicle, not shown. The engine includes a cylinder block 3 provided with a coolant space 5 surrounding the cylinder liners 7 and having air inlet ports 9 extending radially through the coolant space and registering with the charging and scavenging ports 11 in the cylinder liners 7. The cylinder block is also provided with an induction air space 13 surrounding the coolant space 5 and communicating directly with the registering ports 9—11. A piston 15 is slidable in each cylinder liner past the ports 9 therein and is connected by a wrist pin 16 to a connecting rod 17 which is connected in conventional manner to one throw of the multi-throw engine crankshaft, not shown.

A cylinder head 19 having suitable exhaust valves, a fuel injector and operating mechanism therefor, not shown, is secured to the upper face of the cylinder block 3 to form a combustion chamber 21 above each piston 15. The exhaust valves, fuel injector and operating mechanism are enclosed by a cover 23 secured to the cylinder head. The operating mechanism is operable in a well known manner by a camshaft 25 operatively connected to the crankshaft.

The induction air space 13 for the engine is maintained at super-atmospheric pressure by an engine driven blower of the Roots type indicated at 26, which blower is secured to one side of the engine block and operatively connected to the crankshaft by suitable gearing, not shown. The blower 26 is provided with a pressure delivery port 27 communicating directly with the engine induction air space 13 to maintain the pressure therein at super-atmospheric pressure and in excess of the amount required by the engine. The outlet port 27 is located immediately adjacent the cylinder liner charging and scavenging air ports 11 which are placed in communication with this pressure space upon passage of the pistons 15 downwardly past these ports to scavenge the combustion chamber of exhaust gas when the exhaust valves are open and to charge these chambers with air pressure upon closure of these valves and these ports 11 by upward passage of the pistons 15 to provide a conventional two stroke compression ignition operating cycle of the engine in a well known manner upon injection of fuel in the combustion chambers 21 slightly before top dead center of the pistons. The blower 26 is provided with an atmospheric air inlet filter 29 shown on the air inlet end of an air inlet pipe 31, the outlet end of which communicates with the inlet port 33 of the blower. The air inlet filter 29 is of suitable size for supplying adequate amounts of clean air for both the engine and an air brake compressor 35, shown attached to the engine block 3 and operatively connected to the engine crankshaft by suitable drive means, not shown.

The air brake compressor 35 is of conventional type and is supplied with clean air at super-atmospheric pressure from the filter 29 and blower 26 by an inlet pipe 37 connected between the compressor inlet and the induction air space 13 of the engine at a point above the direct path of flow of clean air at super-atmospheric pressure between the blower outlet port 27 and the charging and scavenging air ports 11 in the engine cylinder liners. This arrangement of the supply connection for the compressor 35 has been found to materially reduce the amount of moisture laden air supplied to the compressor. The pressure outlet space of the compressor is connected by a pressure supply pipe 37 to pressure reservoirs, one of which is indicated at 39. The pressure in the reservoirs is maintained at constant pressure sufficient to obtain satisfactory brake operation by a conventional pressure responsive compressor governor indicated at 41. The reservoirs are provided with a safety valve 43 and a drain cock 45 is also provided to drain any condensed water and oil therefrom. An air pressure brake supply pipe 47 including a manually operable brake pressure application and relief valve 49 extends to conventional quick acting automatic relief valves and brake cylinders, not shown, to control application and release of the vehicle road wheel brakes in conventional manner.

By providing an adequate volume of clean air to both the engine and compressor and connecting the inlet of the compressor to a point out of the direct path of air pressure flow between the engine blower and engine scavenging and charging air ports, cleaner and drier air at super-atmospheric pressure is supplied the air brake compressor. This reduces the wear on the compressor and increases its output to the reservoirs so that a quicker pressure recovery rate is provided to take care of frequent brake applications and the amount of water and also the lubricating oil from the compressor carried over with the air delivered by the compressor is reduced making less frequent draining of the water from air brake system necessary to prevent freezing, thereby providing longer periods of trouble free braking operation even in freezing weather because less water condenses in this system.

I claim:

1. In a vehicle air brake system, an internal combustion engine for driving the vehicle, the engine having an air inlet passage, an air brake compressor driven by the engine and having its inlet connected to the engine air inlet passage, and means driven by the engine for supplying air under pressure to the engine air inlet passage and to the air brake compressor to increase the compressor output.

2. In a vehicle air brake system, an air brake compressor, a multicylinder internal combustion engine for driving the vehicle and the compressor, the engine having an air inlet passage in direct communication with the engine cylinders, a branch air inlet conduit connected between the engine air inlet passage and the inlet of the compressor, and air pressure supply means driven by the engine for supplying air under pressure to the engine air inlet passage for direct flow to the engine cylinders and for flow through the branch conduit to the inlet of the air brake compressor.

3. In a vehicle, an air brake system including an air compressor, an internal combustion engine for driving the vehicle and the compressor, the engine having an air supply conduit leading directly to the engine cylinders, a branch supply conduit leading out of the engine supply conduit to the inlet of the air compressor and a second engine driven blower having an air inlet filter for supplying clean air at super-atmospheric pressure to the engine air supply conduit, and to the air brake compressor branch supply conduit leading therefrom.

4. In a vehicle, an air brake system including an air brake compressor, an internal combustion engine for driving the compressor and the vehicle, the engine having cylinders provided with air inlet ports and an air chamber communicating with the cylinder ports, an engine driven blower having an inlet air filter and a pressure discharge port communicating with the engine air chamber adjacent the cylinder ports and a conduit connected between the air brake compressor inlet and the engine chamber at a point outside the direct path of pressure flow between the engine blower and engine cylinder ports.

JOHN FRANK PRIESS.

No references cited.